(12) United States Patent
Bouyat

(10) Patent No.: US 7,683,601 B2
(45) Date of Patent: Mar. 23, 2010

(54) DIGITAL ACQUISITION DEVICE FOR AN AMPLITUDE MODULATION SIGNAL

(75) Inventor: Stephane Bouyat, Saint Cyr (FR)

(73) Assignee: Thales (FR)

( * ) Notice: Subject to any disclaimer, the term of this patent is extended or adjusted under 35 U.S.C. 154(b) by 92 days.

(21) Appl. No.: 12/095,807

(22) PCT Filed: Nov. 8, 2006

(86) PCT No.: PCT/EP2006/068249

§ 371 (c)(1),
(2), (4) Date: Jun. 2, 2008

(87) PCT Pub. No.: WO2007/062967

PCT Pub. Date: Jun. 7, 2007

(65) Prior Publication Data

US 2008/0315935 A1    Dec. 25, 2008

(30) Foreign Application Priority Data

Dec. 2, 2005    (FR) .................................. 05 12260

(51) Int. Cl.
*G01N 27/00*    (2006.01)
*G01P 15/00*    (2006.01)
*H03D 1/00*    (2006.01)
(52) U.S. Cl. ..................... 324/71.1; 73/488; 73/514.32; 73/514.35; 329/358; 329/361
(58) Field of Classification Search ............... 324/71.1; 73/488, 514.16, 514.32, 514.35, 514.39; 329/358–366
See application file for complete search history.

(56) References Cited

U.S. PATENT DOCUMENTS

| 4,910,476 A | 3/1990 | Benoit et al. |
| 6,154,634 A | 11/2000 | Broux et al. |
| 6,324,909 B1 * | 12/2001 | Wyse et al. ............... 73/504.12 |

FOREIGN PATENT DOCUMENTS

FR            892018           3/1944

* cited by examiner

*Primary Examiner*—David Mis
(74) *Attorney, Agent, or Firm*—Lowe Hauptman Ham & Berner, LLP

(57) ABSTRACT

The invention relates to a digital acquisition device for an amplitude modulation signal of a carrier. The acquisition device digitally acquires a useful signal. The useful signal modulates the amplitude of a carrier HF1 which has a frequency and a phase that are known. A modulation of the amplitude of the carrier by the useful signals forms a signal to be processed. According to the invention, the device has a summing device for creating an aggregate signal from a sum of the signal to be processed and a neutralizing signal. The neutralizing signal is a product of the carrier HF1 and of a neutralizing coefficient that can evolve over time, produced by a controlled-gain amplifier device. A load amplifier device amplifies the aggregate signal and produces an amplified aggregate signal. A quadrant comparison device QC is provided for the signal of the amplified aggregate signal and the sign of the carrier which delivers a comparison signal. A sampling device produces a bitstream from the comparison signal. The bitstream forms an image of the useful signal. An integration device produces the neutralizing coefficient, from the bitstream.

10 Claims, 2 Drawing Sheets

DIGITAL ACQUISITION DEVICE FOR AN AMPLITUDE MODULATION SIGNAL

CROSS REFERENCE TO RELATED APPLICATIONS

The present Application is based on International Application No. PCT/EP2006/068249, filed on Nov. 8, 2006, which in turn corresponds to French Application No. 0512260 filed on Dec. 2, 2005, and priority is hereby claimed under 35 USC §119 based on these applications. Each of these applications are hereby incorporated by reference in their entirety into the present application.

FIELD OF THE INVENTION

The invention relates to a digital acquisition device for an amplitude modulation signal of a carrier. The invention also relates to a digital acquisition method for an amplitude modulation signal. The invention is of particular interest in the acquisition of signals delivered by capacitive-type microsensors or any other type of component which produces a very low modulation of the amplitude of a carrier.

BACKGROUND OF THE INVENTION

To acquire analog signals delivered by microsensors, use is made of acquisition devices employing switched capacitors or a charge amplifier. The acquisition devices with switched capacitors constitute a first family of devices which make it possible to take a direct measurement of the electrical charges produced at the terminals of a microsensor by using charge transfers between terminals of capacitors that are incorporated in these devices. The devices with switched capacitors can be produced on ASICs (Application-Specific Integrated Circuits). The devices belonging to this first family are dedicated to the acquisition of signals originating from a single type of microsensor and are, moreover, relatively costly to develop. The acquisition devices with charge amplifier constitute a second family of devices which provide a simple technical solution for indirectly acquiring signals delivered by microsensors. For these devices, acquisition entails measuring an amplitude modulation produced on a carrier by microsensors, for example capacitive-type microsensors, which create, in response to a stimulus, an apparent variation of capacitance producing an amplitude modulation on a carrier. Microgyrometers and microaccelerometers etched on a silicon wafer, on board aircraft, are capacitive-type microsensors.

When idle, that is, when no stimulus is applied to them, the capacitive microsensors present, at their terminals, a capacitance of non-zero value, called "spurious capacitance", denoted $C_{Spurious}$. It can be considered, as is represented in an equivalent electronic diagram of a microsensor 1 in FIG. 1, that the spurious capacitance is in parallel with a second capacitance, called "useful" capacitance and denoted $C_{Useful}$. The changes to the useful capacitance constitute an image of the stimulus that you want to measure. To avoid biasing a measurement of the useful capacitance it is essential to compensate for the effects of the spurious capacitance on the signal delivered by the microsensor.

One solution of the state of the art, known as neutralizing, makes it possible to provide an initial compensation for the spurious capacitance of a microsensor. It consists, when a carrier is injected into a microsensor, in adding to the signal delivered by the microsensor a so-called "neutralizing" signal to form an aggregate signal on which the effects of the spurious capacitance are cancelled or very much reduced. The neutralizing signal has a frequency that is identical to that of the carrier. It is also in phase opposition with the carrier. The amplitude of the neutralizing signal is fixed, determined from an estimation of the spurious capacitance that can result from computations, measurements or charts. The neutralizing signal can be generated, for example, by injection of a carrier in phase opposition with that injected into the microsensor, in a capacitor called a compensation capacitor, denoted $C_{Compensation}$, the value of which is fixed and based on an estimation of the value of the spurious capacitance of the microsensor.

The value of the spurious capacitance of a microsensor can differ from one specimen of a microsensor to another, so that the estimation of the spurious capacitance requires prior measurements which threaten the truly industrial nature of the neutralizing function. Moreover, the value of the spurious capacitance can also vary according to the age of the microsensor, which makes it even more difficult to correct its effects.

FIG. 1 represents a signal acquisition device of a capacitive microsensor according to the state of the art and implementing a neutralizing method.

A microsensor 1 comprises a useful capacitance $C_{Useful}$, the value of which varies in time, and a spurious capacitance $C_{Spurious}$ of fixed value. The variation in useful capacitance reaches, for example, an amplitude of 0.01 picoFarad (pF) at a frequency, for example, of 10 kHz. The spurious capacitance has a value, for example, equal to 10 pF.

A constant-amplitude carrier HF1 is sent to the input of the microsensor, a carrier HF2 is collected at the output of the microsensor and we try to assess the effects of the time variations of the useful capacitance $C_{useful}$ on the amplitude of the carrier HF2 by negating the effects of the spurious capacitance $C_{spurious}$ on the carrier HF2. For this, a neutralizing signal $S_{Neutralizing}$ is used, as described above.

The neutralizing signal $S_{Neutralizing}$ is constructed from the carrier HF1, an inverter device 2, and a compensation capacitance $C_{Compensation}$. The signal at the output of the inverter has an amplitude identical to that of the signal placed at the input of the inverter, it is in phase opposition with the signal with signal placed at the input of the inverter and is denoted $\overline{HF1}$.

The neutralizing signal $S_{Neutralizing}$ is sent to a first input of a summing device 5, the carrier HF2 is sent to a second input of the summing device which delivers to an output an aggregate signal $S_{Aggregate}$ comprising a sum of the carrier HF2 and of the neutralizing signal $S_{Neutralizing}$. The aggregate signal $S_{Aggregate}$ supplies a first inverting input of an amplifier 11, a second non-inverting input of the amplifier being linked to electrical ground. One output of the amplifier is linked to the inverting output through a parallel bridge comprising a load resistor $R_{Load}$ and a load capacitor $C_{Load}$. An amplified aggregate signal is delivered by the output of the amplifier which is low impedance.

Then, the amplified aggregate signal is demodulated, that is, it is multiplied by the carrier HF1 by means of a multiplier 20. The signal delivered by the multiplier 20 is filtered by means of a low-pass filter 30 to form a baseband signal. Finally, the baseband signal is sampled and digitized, for example at a rate of 100 KHz, in the case of a carrier HF1 at the frequency of 250 kHz. The sampling and digitizing device can be, for example, a delta-sigma-type converter which delivers a bitstream comprising, for example, signed bits, at a rate, for example, equal to 100 MHz, and forming a digital measurement of the required amplitude modulation.

This description reveals other drawbacks presented by the signal acquisition devices belonging to the family of "charge amplification" devices of the state of the art. The acquisition device of the state of the art described, acts very much in the majority on analog signals, which poses problems regarding the choice and procurement of critical analog components comprising the acquisition device. Such is the case, for example, for the amplifier 11 and the multiplier 20 which must both be extremely powerful components which are therefore relatively costly. Moreover, it is difficult to integrate these components in an ASIC.

SUMMARY OF THE INVENTION

The aim of the invention is to overcome these drawbacks. More specifically, the invention relates to a device for measuring an amplitude modulation signal of a carrier injected into a microsensor, the device producing an active neutralizing incorporated in a direct delta-sigma conversion loop which also includes a carrier demodulation.

More specifically, the subject of the invention is a digital acquisition device for a useful signal, the useful signal modulating the amplitude of a carrier HF1, the carrier HF1 having a frequency and a phase that are known, a modulation of the amplitude of the carrier by the useful signal forming a signal to be processed, characterized in that it comprises:
- a summing device (5) for creating an aggregate signal from a sum of the signal to be processed and a neutralizing signal, the neutralizing signal being a product of the carrier HF1 and of a neutralizing coefficient that can evolve over time, produced by a controlled-gain amplifier device (6);
- a load amplifier device (10) for amplifying the aggregate signal and for producing an amplified aggregate signal;
- a quadrant comparison device QC (60) for the sign of the amplified aggregate signal and the sign of the carrier which delivers a comparison signal;
- a sampling device (70) for producing a bitstream from the comparison signal, the bitstream forming an image of the useful signal;
- an integration device (80) for producing the neutralizing coefficient, from the bitstream.

An acquisition device according to the invention makes it possible to provide an active neutralizing, that is, it makes it possible to automatically compensate for the effects induced by a spurious capacitance of the microsensor, the non-zero value of which has not previously been assessed. This facilitates industrializing the production of the acquisition devices and makes them insensitive to a drift over time in the spurious capacitance value, this drift possibly being caused, for example, by ageing of the microsensor or by exposure of the microsensor to an extreme thermal environment.

In parallel, the operation of the acquisition device according to the invention leads the signal delivered by the charge amplifier device to be servo-controlled to a level that is as close to zero as possible, which makes it possible to relax the constraints concerning the gain-bandwidth product of this component.

An acquisition device according to the invention also makes it possible to provide a demodulation of the signal produced by the microsensor without using an analog-type multiplier, the production of which is difficult in an ASIC.

Finally, the device according to the invention processes signals that are mostly in a digital form, which facilitates implementing the device on an ASIC and improves the repeatability of the measurement.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by the way of example, and not by limitation, in the figures of the accompanying drawings, wherein elements having the same reference numeral designations represent like elements throughout and wherein.

From one figure to the other, the same elements are identified by the same references.

DETAILED DESCRIPTION OF THE INVENTION

Figure 1:
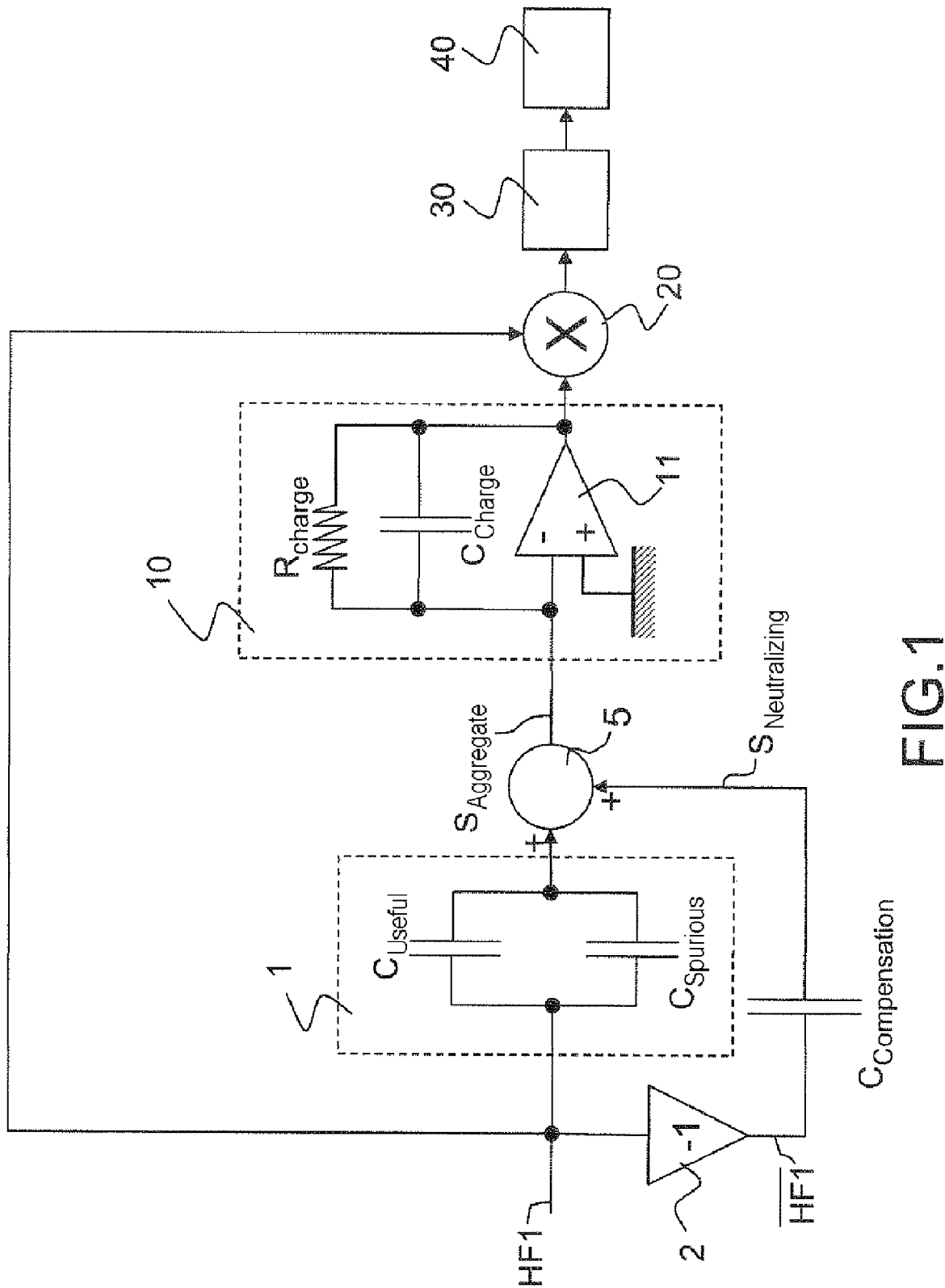
FIG. 1, already described, represents a theoretical diagram of a digital acquisition device for an amplitude modulation signal of a carrier belonging to the "charge amplification" family of the state of the art.
Figure 2:
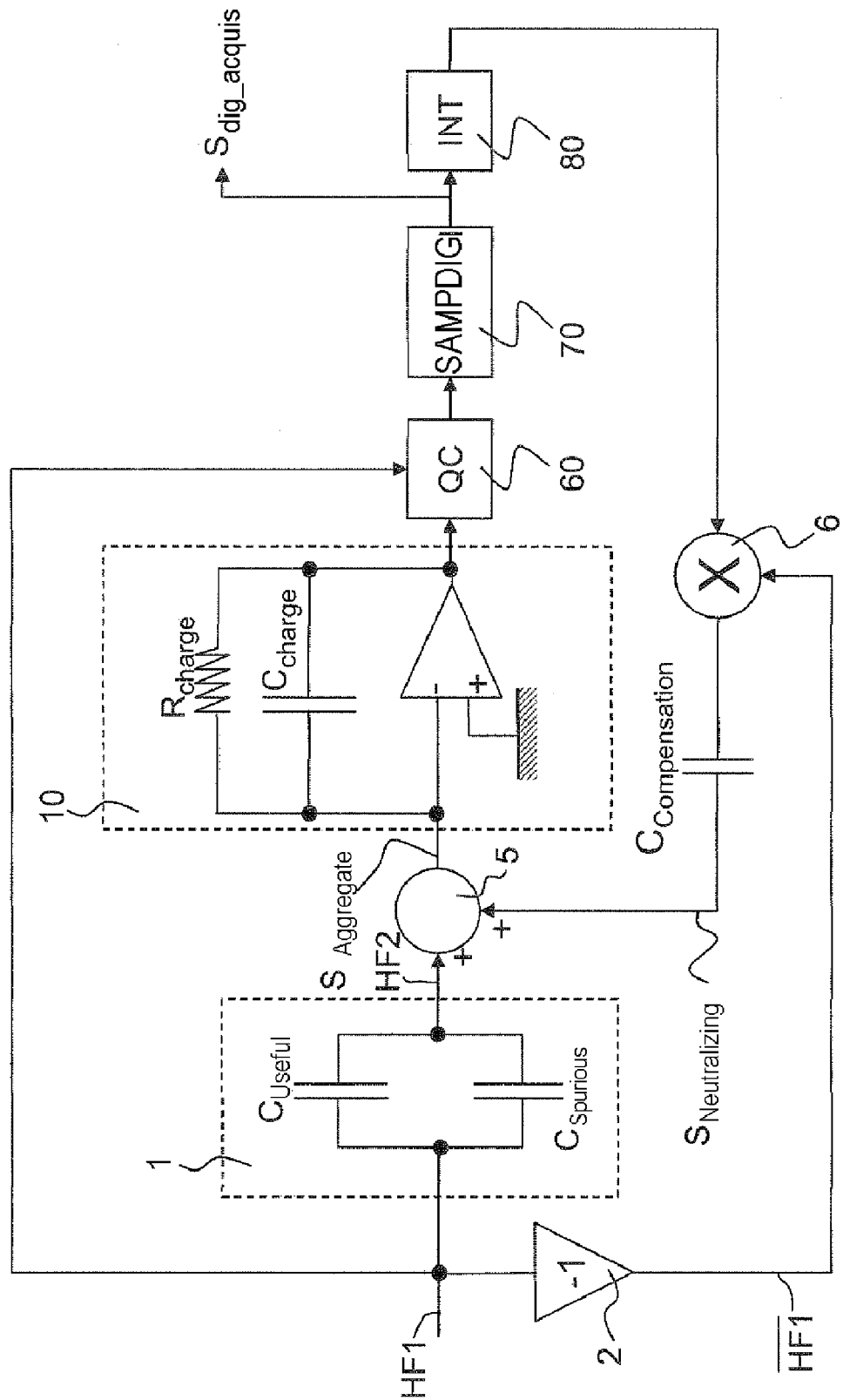
FIG. 2 diagrammatically represents a theoretical diagram of a digital acquisition device for an amplitude modulation signal of a carrier of the "charge amplification" family, according to the invention.

FIG. 2 represents a theoretical diagram of an amplitude modulation signal acquisition device according to the invention. The device according to the invention is employed to measure an amplitude modulation of a carrier HF2 at the output of a microsensor 1 when a constant-amplitude carrier HF1 is applied to the input of the microsensor. The carrier HF2 comprises on the one hand a useful signal that needs to be measured and on the other hand a spurious signal with an amplitude that is stable in time but hampers measurement of the useful signal.

Advantageously, the ratio of the amplitude of the useful signal and the amplitude of the signal to be processed is greater than or equal to 10.

Advantageously, the signal to be processed is generated by a capacitive sensor producing a useful capacitance variation.

The device according to the invention implements a neutralizing operation which consists in adding a neutralizing signal $S_{Neutralize}$ to the carrier HF2 to generate an aggregate signal $S_{Aggregate}$. The neutralizing signal $S_{Neutralizing}$ supplies a first input of a summing device 5, the carrier HF2 supplying a second input of the device 5. The summing device 5 delivers, to an output, an aggregate signal $S_{Aggregate}$ comprising a sum of the carrier HF2 and of the neutralizing signal $S_{Neutralizing}$.

One novelty of the invention comes from the fact that the amplitude of $S_{Neutralizing}$ is not necessarily constant in time. The neutralizing signal $S_{Neutralizing}$ being a signal collected at the output of a compensation capacitor $C_{Compensation}$, the value of which is not the result of a prior measurement, when an auxiliary carrier is placed at the input of the compensation capacitor.

The auxiliary carrier is constructed from the carrier HF1, an inverter 2 and a neutralizing coefficient. The auxiliary carrier is delivered by a controlled-gain amplifier device 6. A first input of the controlled-gain amplifier device 6 is powered by a signal, denoted $\overline{HF1}$, which is in phase opposition with the carrier HF1 and which has an amplitude that is identical to that of the carrier HF1. A second input of the device 6 is supplied by the neutralizing coefficient which is delivered at the output of an integrator INT 80.

According to the invention, the aggregate signal supplies an input of a charge amplifier device 10 which produces an amplified aggregate signal that a locked loop seeks to cancel.

To do this, the sign of the amplified aggregate signal and the sign of a carrier HF1 are first of all compared by means of a Quadrant comparison device QC. The Quadrant comparison device QC comprises only comparator components and digital gates, it is supplied on a first input with the carrier HF1 and on a second input with the amplified aggregate signal. The Quadrant comparison device QC delivers an analog signal comparing the sign of the carrier HF1 and of the amplified aggregate signal.

This analog comparison signal is sampled at the frequency $F_{scan}$ by a sampling and digitizing device SAMPDIG 70 and buffered on values $+V_{ref}$ or $-V_{ref}$ depending on the value of the analog sign signal. The values $+V_{ref}$ and $-V_{ref}$ are values that do not depend on the sampling device SAMPDIG.

The signal delivered by the sampling and digitizing device SAMPDIG constitutes a bitstream made up of signed bits, it supplies a digital measurement of the useful signal and therefore of the time variation of the useful capacitance of the microsensor 1.

The frequency $F_{scan}$ is, for example, 100 MHz for a carrier frequency of, for example, 250 KHz.

The bitstream is sent to the integrator INT 80. One output of the integrator INT delivers a neutralizing coefficient to control the controlled-gain amplifier device 6.

Advantageously, the controlled-gain amplifier device (6) is of analog type.

Advantageously, the controlled-gain amplifier device (6) is of digital type.

For certain applications produced with capacitive-type microsensors, such as gyrometry or accelerometry, it is important to retain a controlled phase shift between the signal delivered by the microsensor and that delivered by the acquisition device.

Advantageously, the devices that it comprises produce a fixed phase shift on the signals that are applied to them.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A digital acquisition device for a useful signal, the useful signal modulating the amplitude of a carrier HF1, the carrier HF1 having a frequency and a phase that are known, a modulation of the amplitude of the carrier by the useful signal forming a signal to be processed, comprising:
    a summing device for creating an aggregate signal from a sum of the signal to be processed and a neutralizing signal, the neutralizing signal being a product of the carrier HF1 and of a neutralizing coefficient that can evolve over time, produced by a controlled-gain amplifier device;
    a load amplifier device for amplifying the aggregate signal and for producing an amplified aggregate signal;
    a quadrant comparison device QC for the sign of the amplified aggregate signal and the sign of the carrier which delivers a comparison signal;
    a sampling device for producing a bitstream from the comparison signal, the bitstream forming an image of the useful signal; and
    an integration device for producing the neutralizing coefficient, from the bitstream.

2. The device as claimed in claim 1, wherein the ratio of the amplitude of the useful signal and the amplitude of the signal to be processed is greater than or equal to 10.

3. The device as claimed in claim 1, wherein the signal to be processed is generated by a capacitive sensor producing a useful capacitance variation.

4. The device as claimed in claim 1, wherein the controlled-gain amplifier device is of analog type.

5. The device as claimed in claim 1, wherein the controlled-gain amplifier device is of digital type.

6. The device as claimed in claim 1, wherein the devices that it comprises produce a fixed phase shift on the signals that are applied to them.

7. The device as claimed in claim 2, wherein the signal to be processed is generated by a capacitive sensor producing a useful capacitance variation.

8. The device as claimed in claim 3, wherein the controlled-gain amplifier device is of analog type.

9. The device as claimed in claim 4, wherein the controlled-gain amplifier device is of digital type.

10. The device as claimed in claim 5, wherein the devices that it comprises produce a fixed phase shift on the signals that are applied to them.

* * * * *